Sept. 7, 1954     H. F. HICKEY     2,688,255
CHANGE-SPEED MECHANISM FOR PHONOGRAPH TURNTABLES
Filed Oct. 23, 1951
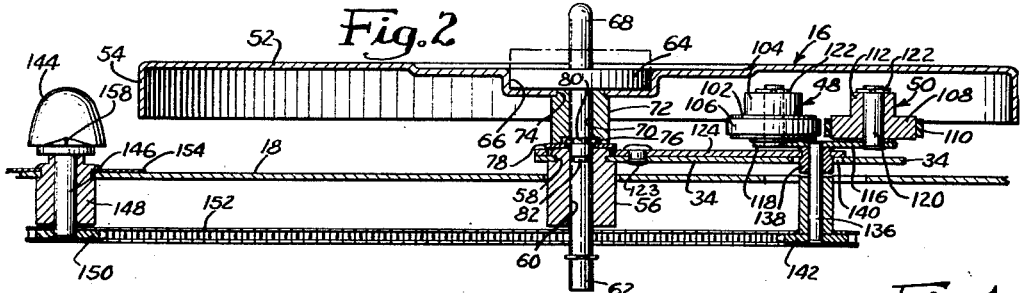
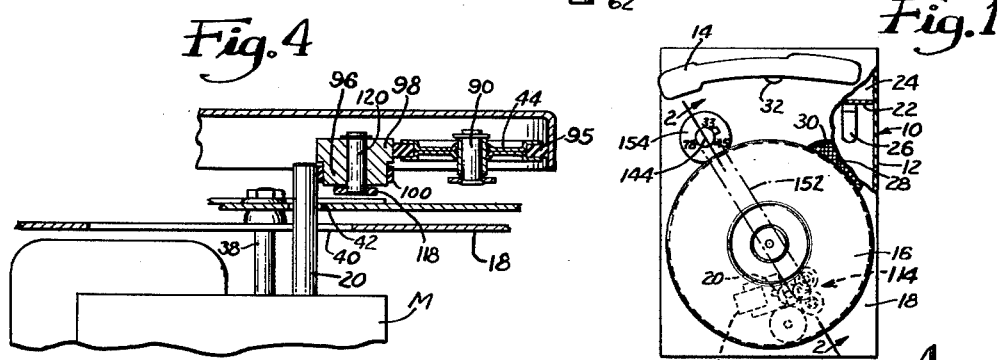
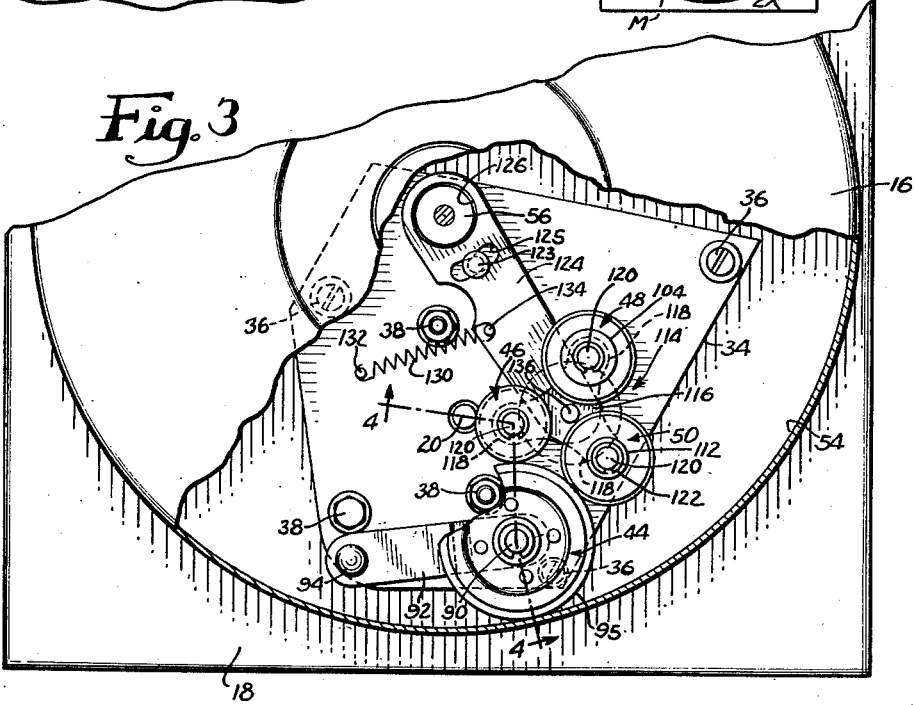
INVENTOR.
Harold F. Hickey

Patented Sept. 7, 1954

2,688,255

UNITED STATES PATENT OFFICE 2,688,255

CHANGE-SPEED MECHANISM FOR PHONOGRAPH TURNTABLES

Harold F. Hickey, Chicago, Ill., assignor to United Pressed Products Co., Chicago, Ill., a corporation of Illinois Application October 23, 1951, Serial No. 252,682

12 Claims. (Cl. 74—199)

The present invention relates to change-speed mechanism for phonograph turntables and more particularly to a variable speed transmission whereby a phonograph turntable may be driven from a constant speed motor at any one of a plurality of predetermined speeds in order to accommodate records having varying sound track speed standards.

Present day commercial practice in the United States, with but few exceptions, involves the cutting of records for playing at turntable speeds at 78 R. P. M., 45 R. P. M., or 33 R. P. M. As a consequence, various change-speed mechanisms have been devised by means of which phonograph turntables may selectively be rotated at any one of these three conventional or standard speeds.

It is among the general objects of the present invention to provide a change-speed mechanism for phonograph turntables involving a traction drive for the turntable rim which is simpler in construction and more reliable in its operation than existing installations for accomplishing the same purpose.

Another important object of the invention is to provide a traction drive, change-speed mechanism for phonograph turntables which involves the use of a number of selectively operable, spring biased, idler friction wheels capable of being selected to establish different speed ratios between the motor shaft and the turntable and in which the included angle between the centers of the friction wheels which are operative at any given time, and the center of the motor shaft, is an optimum angle for frictional driving efficiency.

Yet another important object is to provide a change-speed mechanism of the type briefly outlined above in which only those friction wheels which are preoccupied in establishing a particular speed ratio are maintained in motion while those not so employed are motionless, thus contributing toward quiet operation as well as long life of the mechanism.

In carrying out the above mentioned objects, the invention overcomes many of the limitations that are attendant upon the use of traction drive change-speed mechanism having selectable compound driving wheels for establishing different speed ratios. Such constructions ordinarily employ a traction idler wheel in engagement with the turntable rim and adapted to be driven by different ones of the compound driving wheels. The selectable compound driving wheels are usually movable into and out of engagement with the idler and assume positions around the peripheral regions of the idler which are comparatively widely spaced apart. Thus the included angle between the center of the motor shaft, the center of the idler wheel, and its tangential point of contact with the turntable rim may be an optimum angle for frictional driving efficiency for one of the friction wheels, but this optimum angle is not maintained when the other friction wheels are selected and brought into engagement with the traction wheel.

In overcoming this limitation that is attendant upon the use of other change-speed mechanisms, the present invention likewise contemplates the provision of a traction idler wheel in engagement with the turntable rim, but it dispenses with the use of the motor shaft for direct driving of the traction idler wheel and, instead, it utilizes a series of selectible compound driving idler wheels which are, upon selection thereof, individually movable into engagement with both the motor shaft and the traction idler wheel to establish a driving connection from the former to the latter. Means are provided whereby the compound idler wheels can be moved into such bridging engagement with the motor shaft and traction idler wheel in the same general tangential regions with respect to both members so as to preserve, within small angular limits, an optimum frictional driving train from the motor shaft to the turntable rim for each selected speed ratio.

The provision of a change-speed mechanism for phonograph turntables which is simple in its construction; one which may, by manipulation of a single control knob, position the driving mechanism for any one of the three rotational speeds of which the turntable is capable; one in which the moving parts thereof are conveniently enclosed within the turntable rim and beneath the turntable disk where they are concealed from view; one which is comprised of a minimum number of moving parts and which therefore is unlikely to get out of order; one which is comprised largely of sheet metal stampings and which therefore may be manufactured at a low cost, and one which otherwise is well adapted to perform the services required of it, are further desirable features that have been borne in mind in the production and development of the present invention.

In the accompanying single sheet of drawings forming a part of this specification one embodiment of the invention has been shown.

In these drawings:

Fig. 1 is a plan view of a phonograph unit embodying the improved change-speed mechanism of the present invention, a portion of the chassis platform being broken away to reveal the interior mechanism;

Fig. 2 is a sectional view taken substantially along the line 2—2 of Fig. 1;

Fig. 3 is an enlarged fragmentary plan view of a portion of the phonograph unit shown in Fig. 1 with a portion of the turntable broken away; and Fig. 4 is a sectional view taken substantially along the line 4—4 of Fig. 3.

In all of the above described views, like characters of reference are employed to designate like parts throughout.

Referring now to the drawings in detail, and particularly to Fig. 1, the invention is shown as being applied to a phonograph chassis assembly 10 of more or less conventional design adapted to be mounted in a suitable cabinet or carrying case (not shown). For illustrative purposes, the assembly 10 is shown as being a complete self-contained unit including a chassis proper 12, on which there is mounted a conventional swinging pick-up arm 14 which may be of the piezo-electric or magnetic type. The assembly further includes a rotary turntable 16 capable of accommodating records of the 78 R. P. M., the 45 R. P. M. or the 33 R. P. M. variety. A motor M is suitably mounted beneath the chassis platform 18 and has a driving shaft 20 by means of which torque may be applied to the turntable to rotate the latter at varying rates of speed through the medium of the speed-change mechanism of the present invention, all in a manner that will be made clear presently.

A partition wall 22 beneath the chassis platform 18 provides an amplifier compartment 24 in which there may be mounted the various electrical components of a conventional amplifier section such as one or more vacuum tubes 26 and other electrical accoutrements (not shown). A speaker unit 28 may be mounted beneath the chassis platform in register with a chassis opening 30 and a suitable on-off switch and volume control knob 32 serves to control the operation of the phonograph assembly in the usual manner by completing the motor and amplifier filament circuits simultaneously or by opening them.

The chassis assembly 10 briefly outlined above is thus suitable for mounting in a portable carrying case or in a cabinet to provide a complete marketable phonograph assembly including the change-speed mechanism of the present invention. The assembly 10 is also suitable for mounting in a radio or television cabinet, console or the like. Furthermore, the change-speed mechanism of the invention may be designed for use as a built in part of various radio or television cabinets in which case the amplifier section and speaker unit of the radio or television set may be operatively and electrically connected to the pick-up unit. If desired, the change-speed mechanism of the invention may be installed on existing phonograph assemblies by suitable modification thereof, all in a manner conformable to the principles of the invention.

Referring now to Figs. 2, 3 and 4, the change-speed mechanism comprising the present invention is, in the main, mounted upon a supporting plate 34 spaced above the platform 18 by means of suitable yieldable spacer bolt assemblies 36. The plate 34 may also constitute a suspension plate for the motor M and, toward this end, suitable suspension bolt assemblies 38 are provided. The motor shaft 20 projects upwardly through an opening 40 in the platform 18 and through another opening 42 in the plate 34 and terminates a short distance above the latter plate.

The change-speed mechanism of the present invention is designed to selectively establish one of three different driving power trains between the continuously running constant speed motor shaft 20 and the turntable 16. To accomplish this, a plurality of friction wheel trains are provided, each train providing a different speed ratio drive, and each including a common traction idler wheel 44 and a selected one of three compound wheels 46, 48 and 50, respectively.

The turntable 16 is provided with a circular disk platform 52 having the usual depending annular peripheral flange 54. A turntable bushing 56 is fixedly mounted within an opening 58 in the plate 34. The top of this bushing is rounded to constitute an anti-friction thrust bearing for supporting the turntable. The bushing 56 has a vertical central bore 60 formed therein for reception of a turntable spindle 62 (Fig. 2). The spindle 62 is formed medially thereof with an adapter plug or disk 64 which fits within a recess or depression 66 in the platform 52 and the portion of the spindle 62 above the disk 64 constitutes a centering pin 68 for records of the conventional 78 R. P. M. and 33 R. P. M. variety. The spindle 62 is slidably mounted in a bore 70 provided in a sleeve 72, the upper end of which is suitably secured in an opening 74 provided in the bottom of the depression 66. The sleeve 72 rests on a washer 78 which in turn rests and turns on the rounded top of the bushing 56. The spindle is axially shiftable from the full line position shown in Fig. 2 wherein the adapter plug 64 is nested within the depression 66 to the dotted line position thereof wherein the adapter plug 64 assumes an elevated position and constitutes a centering plug for reception thereover of the enlarged opening ordinarily provided in conventional records of the 45 R. P. M. variety. The spindle 62 is adapted to be releasably retained in either of the two positions of which it is capable of assuming by means of a spring wire split ring 76 carried within a recess formed in the underneath surface of the sleeve 72 and and which snaps into either of two annular grooves 80 and 82 formed in the spindle 62.

The spindle 62 and adapter plug 64 formed thereon, together with the instrumentalities for retaining the spindle and plug in either of its two positions, forms no part of the present invention and no claim is made herein to any novelty associated with the same. For a fuller description and a better understanding thereof, reference may be had to my application for patent for "Center Spindle for Phonograph Turntable," filed of even date herewith.

Referring now to Figs. 2, 3 and 4, the common traction idler wheel 44 is rotatably carried on a stub shaft 90 which is mounted on the free end of a swinging arm 92 that overlies the plate 34 and is pivoted thereto at 94. The traction idler wheel 44 is preferably provided with a resilient traction rim or tire 95 in the form of a continuous band of rubber or other suitable resilient material which is adapted to be brought into tractional engagement with the depending flange or rim 54 of the turntable 16, while at the same time frictionally engaged by one of the speed changing compound wheels or pulleys 46, 48 or 50, so that the engaged wheel drives the idler 44 which in turn drives the turntable.

The speed changing wheels 46, 48 and 50 are of the compound stepped variety, the wheel 46 having a lower cylindrical portion 96 of predetermined diameter and an upper larger cylindrical portion 98 of the same or different diameter. A circular rim or tire 100 is disposed on the lower cylindrical portion 96. The wheel 48 has a lower cylindrical portion 102 and an upper reduced cylindrical portion 104. The lower cylindrical portion 102 carries a resilient circular friction ring or tire 106. The friction wheel 50 has a lower cylindrical portion 108 having a resilient rim or tire 110 mounted thereon and an upper reduced cylindrical portion 11. The three compound wheels 46, 48 and 50 constitute part of a turret assembly designated in its entirety at 114 and including a three-armed spider 116, in the form of a flat sheet metal plate or stamping, the three arms 118 of which diverge radially outwardly at angles 120° from one another. Each of the three compound wheels is rotatably mounted on a vertically extending stub shaft 120 carried at the end of one of the arms 118. A retaining spring clip 122 in the form of a "C" retains each wheel on its respective stub shaft.

The turret assembly 114 is rotatably mounted on the end of a pivoted free swinging arm or lever 124 in the form of a flat sheet metal stamping having an opening 126 which is received over the extreme upper end of the turntable bushing 56 in such a manner that this end of the bushing constitutes a pivot center about which the arm 124 is adapted to swing freely. The arm 124 rests upon the upper face of the plate 34 and is slidable thereon through its limited extent of swinging movement. A rivet 123 is secured to the plate 34 and passes through an oversize arcuate hole 125 in the lever 124 to limit the swinging movement thereof.

Referring now to Figs. 2 and 4, the medial horizontal plane of the resilient rim 95 of the idler wheel 44 lies between the upper and lower horizontal planes of the three cylindrical portions 98, 104, and 112 of the wheels 46, 48 and 50, respectively, and is designed for selective engagement with the peripheries of these portions when the angular position of the turret assembly 114 is such as to bring the parts into such engagement. Similarly the lower resilient rim portions or tires 100, 106 and 110 of the wheels 46, 48 and 50, respectively, occupy a common medial horizontal plane at a level which will permit these rim portions to selectively engage the upper region of the continuously rotating motor shaft 20 so as to be tractionally driven thereby. A coil spring 130 has one end thereof anchored as at 132 to the plate 34 and has its other end secured as at 134 to the arm 124 medially thereof. The spring 130 normally urges the arm 124 in a clockwise direction as viewed in Fig. 3, so as to bring a selected wheel 46, 48 or 50, as the case may be, into frictional engagement with the shaft 20 and with the idler wheel 44. In Fig. 3 the turret wheel 46 is shown as being in position with the resilient rim 100 thereof in engagement with the motor shaft 20 and with its upper cylindrical portion 98 thereof in engagement with the resilient rim 95 of the idler wheel 44. The arm 92 on which the idler wheel 44 is mounted is a free floating arm and when a particular wheel 46, 48 or 50, as the case may be, has been selected and brought into frictional engagement with the motor shaft 20 and with the idler wheel 44, the spring 130, acting on the arm 124 and through the turret spider 116, serves to yieldably maintain the selected wheel in engagement with both the motor shaft and traction wheel and thus force the latter into tractional engagement with the inner surface of the turntable rim 54 to drive the latter.

The turret spider 116 is turned by a central supporting spindle 136 which is integral therewith and is journalled in a bushing 138 fixed to the outer end of the arm 124. The spindle 136 projects through a clearance opening 140 in the plate 34 and has a sprocket wheel 142 secured thereto at its lower end. An adjusting knob 144 (Figs. 1 and 2) is mounted on a shaft 146 which is rotatably supported in a bushing 148 fixed on the chassis platform 18 at a point remote from the turret assembly 114 and at a region wherein the knob 144 is conventionally accessible for manipulation thereof and substantially in line with the arm 124 so that the axis of the spindle 136 is substantially in the vertical plane determined by the central axis of the spindle 136 and the central axis of the bushing. A sprocket wheel 150 is secured to the lower end of the shaft 146. A sprocket chain 152 passes around the two sprocket wheels 142 and 150 keyed thereto to transmit motion of the shaft 146 to the shaft 136 so that the angular position of the turret assembly 114 may be selectively controlled.

The diameter of the motor shaft 20, and the diameters of the cylindrical portions of the various wheels 46, 48 and 50, as well as the overall diameter of the idler wheel 44 bear a definite relationship with respect to one another as well as with respect to the internal diameter of the turntable rim 54. This relationship is such that the desired speed of rotation will be imparted to the phonograph turntable when a selected compound wheel is in operative driving position. The wheel 46 is designed to transmit motion from the constant speed motor shaft 20 to the idler wheel 44, so that the latter will drive the turntable at its fastest rate of turning movement, namely at 78 R. P. M. The wheel 48 when selected for operation transmits motion from the motor shaft 20 to the idler wheel 44, so that the latter will rotate the turntable at 45 R. P. M. Similarly the compound wheel 50, when selected, has a large circumferential portion in engagement with the motor shaft 20 and a relatively small circumferential portion in engagement with the idler wheel 44, so as to impart a 33 R. P. M. motion to the turntable 16.

To assist the operator in proper selection of power trains the selector knob 144 may have associated therewith a suitable indicia plate 154 provided with indicia marks thereon designed for cooperation with a pointer 158 provided on the knob 144. The indicia marks may represent the three rotational speeds of which the turntable is capable.

In the operation of the change-speed mechanism, turning movement of the selector knob 144 in a clockwise direction as viewed in Fig. 1 will transmit motion from the sprocket wheel 150 to the sprocket wheel 142 through the medium of the chain 152, thus urging the turret assembly 114 to rotate in a clockwise direction. Such motion of the turret assembly will cause whichever wheel 46, 48 or 50, as the case may be, happens to be in operative driving position to move out of engagement with the motor shaft 20. At this time the arm 124 turns counter-clockwise a small amount against the action of the spring 130. A moment later the next adjacent idler wheel will ride over the surface of the idler wheel 44 and, under the action of the spring 130 on the arm 124, will "snap" into position to establish its respective power train. It is contemplated that the knob 144 shall be capable of rotation in opposite directions for selection purposes, and in such an instance the operative idler wheel will move away from the motor shaft 20 and ride on the surface of the idler wheel 44 while at the same time the next adjacent compound wheel will move into centered position between the motor shaft and idler wheel. It is merely necessary in any event that the selector knob 144 be brought to an approximate position and then released. Thereafter the action of the spring 130 will complete the centering movement of the particular selected compound wheel 46, 48 or 50.

If desired, the knob may be restricted to turning movement in a clockwise direction by the provision of an abutment in the form of a post on the platform 18 at a location wherein it is in the path of movement of the outer ends of the turret spider arms 118. When any one selected compound wheel is in operative position, the post occupies a position in the path of reverse or counter-clockwise motion of one of the spider arms and prevents reverse rotation of the turret, but it does not interfere with clockwise movement of the turret during selection of the speed-controlling wheel 46, 48 or 50 by means of the selector knob 144.

If the ratio of the diameter of the motor shaft 20 with respect to the internal diameter of the turntable rim 54 is such that when the motor is operating at its rated constant speed the turntable 54 will be driven at 78 R. P. M. when the diameters of the upper and lower driving and driven parts of the compound pulley 46 have a one to one ratio, then the ratios of the diameters of the driving to the driven parts 104 to 106 of the pulley 48, and 112 to 110 of the pulley 50, are fixed as the ratios 45 to 78 and 33 to 78 respectively. This fixes the ratios of the upper and lower diameters of each of the three compound wheels. The actual diameters are then determined, within those ratios, by another consideration. When a compound driving wheel is brought into its operative position such as, for instance, the wheel 46 of Fig. 3, it is desirable that the driving angle shall be of the order of 115° and that the variation from this optimum angle shall not exceed 5° above or below the optimum value of 115°. Beyond these limits there may be objectionable slippage if the angle is too large or wedging if the angle is too small. This means that if a line is drawn in Fig. 3 from the center of the compound wheel 46 to the center of the motor shaft and if another line is drawn from the center of the compound wheel 46 to the center of the idler 44, these two lines should make an angle of 115° plus or minus 5°. The same is to be true when either one of the other two compound wheels 48 or 50 is brought into operative position. With fixed centers for the motor shaft 20 and for the idler 44 and with fixed diameters for the motor shaft and for the idler 44 it is possible to calculate the diameters of the compound pulley 46, 48 or 50, which will give that driving angle of 115° plus or minus 5°, as above set forth. Thus, when the diameters and locations of the motor shaft 20 and of the idler 44 have been determined and the ratios of the compound wheels are determined as 78 is to 45 is to 33, which are the standards of the speeds of the different phonograph records involved, then the absolute sizes of the driven and driving portions of the wheels 46, 48 and 50 are fixed at a diameter to maintain the driving angle at the values hereinabove specified, regardless of which compound wheel is in driving position.

It is to be noted that when any one of the compound wheels 46, 48 or 50 is in a position approaching its useful position, namely, the position illustrated by the wheel 46 in Fig. 3, the center of the wheel 46 is movable above the center 136 which in turn is movable about the center of the turntable. The path of movement of the center of the compound wheel 46 about the center 136 is, at this time, almost at right angles to the path of movement of the movable center 136. This relationship enables the spring 130 to bring the compound wheel into engagement with the driving shaft 20 and the driven idler 44, resulting in a self-centering action.

The invention is not to be limited to the exact arrangement of parts shown in the accompanying drawings and described in this specification as various changes in the details of construction may be resorted to without departing from the spirit of the invention. Only insofar as the invention has particularly been pointed out in the accompanying claims is the same to be limited.

I claim:

1. Change-speed mechanism for transmitting rotary motion of a driving member to a rotary phonograph turntable, comprising an idler wheel in driving engagement with said turntable, a support for compound wheels, a plurality of compound wheels on said support, said compound wheels having different motion transmitting characteristics individually and selectively movable on said support from inoperative positions out of contact with said driving member and said idler wheel to operative motion transmitting positions in simultaneous contact with said driving member and said idler wheel wherein they assume substantially the same general positional relationship with respect to both the driving member and the idler wheel, means for selectively moving said compound wheels to their operative positions, and means yieldingly urging the support in a direction to press that compound wheel which is in its operative position toward said driving member and said idler wheel.

2. Change-speed mechanism for transmitting rotary motion of a driving member to a rotary phonograph turntable, comprising an idler wheel in driving engagement with said turntable, a support movable bodily in opposite directions toward and away from said driving member and said idler wheel, a plate mounted for angular adjustment on said support, a plurality of compound wheels mounted for independent rotation on said plate about respective axes spaced about the axis of movement of said plate, means yieldingly urging said support toward said driving member and said idler wheel, each of said compound wheels having peripheral regions of different effective diameters and designed for simultaneous engagement with said driving member and said idler wheel respectively, under the influence of said yielding means when the plate is in a predetermined angular position, and means for adjusting the angular position of the plate with respect to said support to selectively bring said compound wheels into frictional engagement with said driving member and said idler wheel.

3. Change-speed mechanism for transmitting rotary motion from a driving to a driven member, a carriage movable bodily in opposite directions toward and away from both of said members, a plate mounted for angular turning movement on said carriage, a plurality of compound wheels mounted for independent rotation on said plate about respective axes spaced from the axis of movement of said plate, means yieldingly urging said carriage toward both of said members, each of said compound wheels having a peripheral region designed for engagement with said driving member when said plate is in a predetermined position of angularity and having another peripheral region designed for engagement with said driven member when the plate is in said predetermined position, the diameters of said peripheral regions of the compound wheels being different so that each compound wheel when in engagement with said members constitutes an element of a different power train and transmits motion of said driven member to said driving member at a different speed ratio, and means for adjusting the angular position of the plate with respect to said carriage for bringing said compound wheels selectively into engagement with both of said members.

4. Change-speed mechanism for transmitting rotary motion of a driving member to a phonograph turntable, comprising a support movable toward and away from the peripheral regions of said turntable, a traction wheel rotatably mounted on said support and movable bodily therewith into engagement with the turntable, a second support movable bodily in opposite directions toward and away from said driving member and said traction wheel, a plate mounted for angular turning movement on said second support, a plurality of compound wheels mounted for independent rotation on said plate about respective axes spaced about the axis of movement of the plate, means yieldingly urging said second support toward said driving member and traction wheel, each of said compound wheels having peripheral regions of different effective diameters and designed for simultaneous engagement with said driving member and said traction wheel, respectively, under the influence of said yielding means when the plate is in a predetermined angular position, the components of thrust of said compound wheels against said driving member and said traction wheel under the influence of said yielding means serving to force said driving member and said traction wheel apart relative to each other and thus urge the bodily movable traction wheel into tractional engagement with the turntable, and means for adjusting the angular position of said plate with respect to said second support for bringing said compound wheels into engagement with said motor shaft and traction wheel selectively.

5. Change-speed mechanism for transmitting rotary motion of a relatively constant speed motor to a rotary phonograph turntable having a depending annular flange, said change-speed mechanism including a supporting plate mounted beneath said turntable and within the vertical confines of said flange, an idler wheel mounted on said plate for movement bodily toward and away from said flange and designed for tractional engagement with the latter, a support movably mounted on said plate and movable toward and away from said motor shaft and idler wheel, a rotary turret mounted on said support and bodily movable therewith, a plurality of compound wheels mounted for independent rotation on said turret about spaced apart axes of rotation, means yieldingly urging said support toward said motor shaft and idler wheel, each of said compound wheels having peripheral regions of different effective diameters for engagement with said motor shaft and with the idler wheel, respectively, under the influence of said yielding means when the turret is in a predetermined angular position, the components of thrust of said compound wheels against said idler wheel under the influence of said yielding means serving to force the idler wheel into engagement with said turntable flange, and means for adjusting the angular position of said turret with respect to said support.

6. Change-speed mechanism for transmitting rotary motion of a relatively constant speed motor to a rotary phonograph turntable having a depending peripheral flange, said mechanism including a supporting plate mounted beneath said turntable and within the vertical confines of said flange, an arm pivotally mounted on said plate for swinging movement about a vertical axis, an idler wheel mounted for rotation about a vertical axis and bodily movable toward and away from said flange upon swinging movement of the arm, a second arm pivotally mounted on said plate for swinging movement about a vertical axis, a turret rotatably mounted on the free end of said latter arm and movable upon swinging movement of the arm in a direction generally toward and away from said motor shaft and idler wheel, a plurality of compound wheels mounted for independent rotation on said turret, said wheels being selectively movable into simultaneous engagement with said motor shaft and idler wheel upon movement of the turret toward said motor shaft and idler wheel, yielding means normally urging said second arm in a direction to cause engagement of a selected compound wheel with said motor shaft and idler wheel, the selected compound wheel, when in engagement with said idler wheel, serving to force the latter into engagement with said turntable flange under the influence of said yielding means, and means for adjusting the angular position of said turret to select one of said compound wheels for engagement with said motor shaft and idler wheel.

7. Change-speed mechanism for transmitting the rotary motion of a relatively constant speed motor driven member to a rotary phonograph turntable, said mechanism comprising a plurality of wheels capable of selection in different combinations to establish a plurality of different power trains from said member to said turntable, said wheels including an idler wheel common to said power trains, and a plurality of intermediate compound wheels bodily movable from retracted positions wherein they are out of engagement with said member and an idler wheel to advanced positions wherein they engage both said member and said idler wheel, means for selectively moving said intermediate wheels into such engagement, and spring means pressing the selected intermediate wheel toward said idler wheel.

8. Change-speed mechanism for transmitting rotary motion from a driving member to a driven member, said mechanism comprising a movable support, a turret rotatably mounted on the support, a plurality of selectible compound wheels mounted for independent rotation on said turret and each having driving and driven wheel circle parts of different diameters, said compound wheels being successively movable upon turning movement of the turret in one direction from inoperative positions out of register with said members into an operative position wherein the driven part thereof engages the driving member and the driving part engages the driven member, means yieldingly urging the support in a direction to cause a selected compound wheel which is in the operative position to engage both members and establish a driving relationship between them, and means for rotating said turret to select one of said compound wheels.

9. Change-speed mechanism for transmitting the rotary motion of a relatively constant speed driving member to a driven member comprising a rotary phonograph turntable having a depending peripheral flange, said mechanism comprising an idler wheel in engagement with said flange and spaced from said driving member, a movable support, a rotatable turret mounted on said support and bodily movable therewith in a general direction toward and away from the driving member and said idler wheel, a plurality of selectible compound wheels mounted for independent rotation on said turret about separate axes spaced about the axis of rotation of the turret, said compound wheels being successively movable upon turning of said turret into positions wherein they are in approximate register with the space existing between the idler wheel and the driving member, yieldable means urging said support in the direction of said space to cause a selected compound wheel to engage said driving member and idler wheel to connect the same in driving relationship, the included angle between the centers of a selected compound wheel, the driving member and the idler wheel being of the order of 115° when the selected compound wheel is in engagement with the driving member and with the idler wheel, and means for turning said turret.

10. A variable speed driving mechanism for the turntable of a phonograph assembly including a chassis platform, a turntable rotatably mounted on said platform and having a depending marginal flange, an arm pivoted to said platform for swinging movement, an idler wheel rotatably mounted at the free end of said arm and movable bodily with the arm into engagement with said peripheral flange in driving relationship with respect thereto, a motor supported beneath said platform and having a motor shaft projecting upwardly through the platform within the confines of said peripheral flange, a second arm pivoted for swinging movement about the axis of rotation of the turntable, a turret rotatably mounted on the free end of said second arm, a plurality of compound wheels spaced about the axis of said turret and selectively movable upon angular turning movement of the turret into positions of approximate register with the space between said motor shaft and idler wheel, means normally biasing said second arm in the general direction of the motor shaft and idler wheel to bring a selected compound wheel on said turret into frictional engagement with both the motor shaft and the idler wheel and, by a spreading action, force the idler wheel into tractional engagement with said peripheral flange, and means for changing the angular position of said turret on the arm to select different idler wheels.

11. Change-speed mechanism for transmitting the rotary motion of a driving member to a rotary driven member, said mechanism comprising a movable support, a rotatable turret mountable on said support and bodily movable therewith in a general direction toward and away from an imaginary line joining the driving and the driven members, a plurality of selectible compound power transmitting wheels of different drive ratios mounted each for independent rotation on said turret about separate spaced axes, said turret being movable to bring said compound wheels successively into positions where they are in approximate register with the space between the driving and driven members, yielding means urging the support in the direction of said space to bring a selected compound idler wheel into engagement with said driving member and with said driven member to connect the same in driving relationship, the included angle between the centers of a selected compound wheel, the driving member, and the driven member being of the order of 115° when the selected compound wheel is in engagement with the driving member and with the driven member, and means for turning said turret.

12. Means for transmitting the rotary motion of a driving member to a rotary driven member, said means comprising a movable support, a turret movably mounted on said support, a plurality of compound power transmitting wheels mounted on said turret about spaced apart parallel axes, each compound wheel including a driven wheel and a driving wheel, the diameters of the driven and driving wheels of the different compound wheels being of different ratios, spring means urging a selected one of the compound wheels to a position where its driven wheel engages the driving member and its driving wheel engages the driven member to transmit rotary motion between the two members in a ratio determined by the ratios of the diameters of the driven and driving wheels of the selected compound wheel, said spring means acting on said compound wheels through said support and said turret, and means for moving the turret with respect to the support for selecting different ones of the compound wheels.

References Cited in the file of this patent

UNITED STATES PATENTS

| Number | Name | Date |
|---|---|---|
| 2,241,013 | Gay | May 6, 1941 |
| 2,518,769 | Gay | Aug. 15, 1950 |
| 2,518,826 | Slough | Aug. 15, 1950 |
| 2,598,138 | Sharp | May 27, 1952 |
| 2,646,688 | Slough | July 28, 1953 |